Patented June 20, 1950

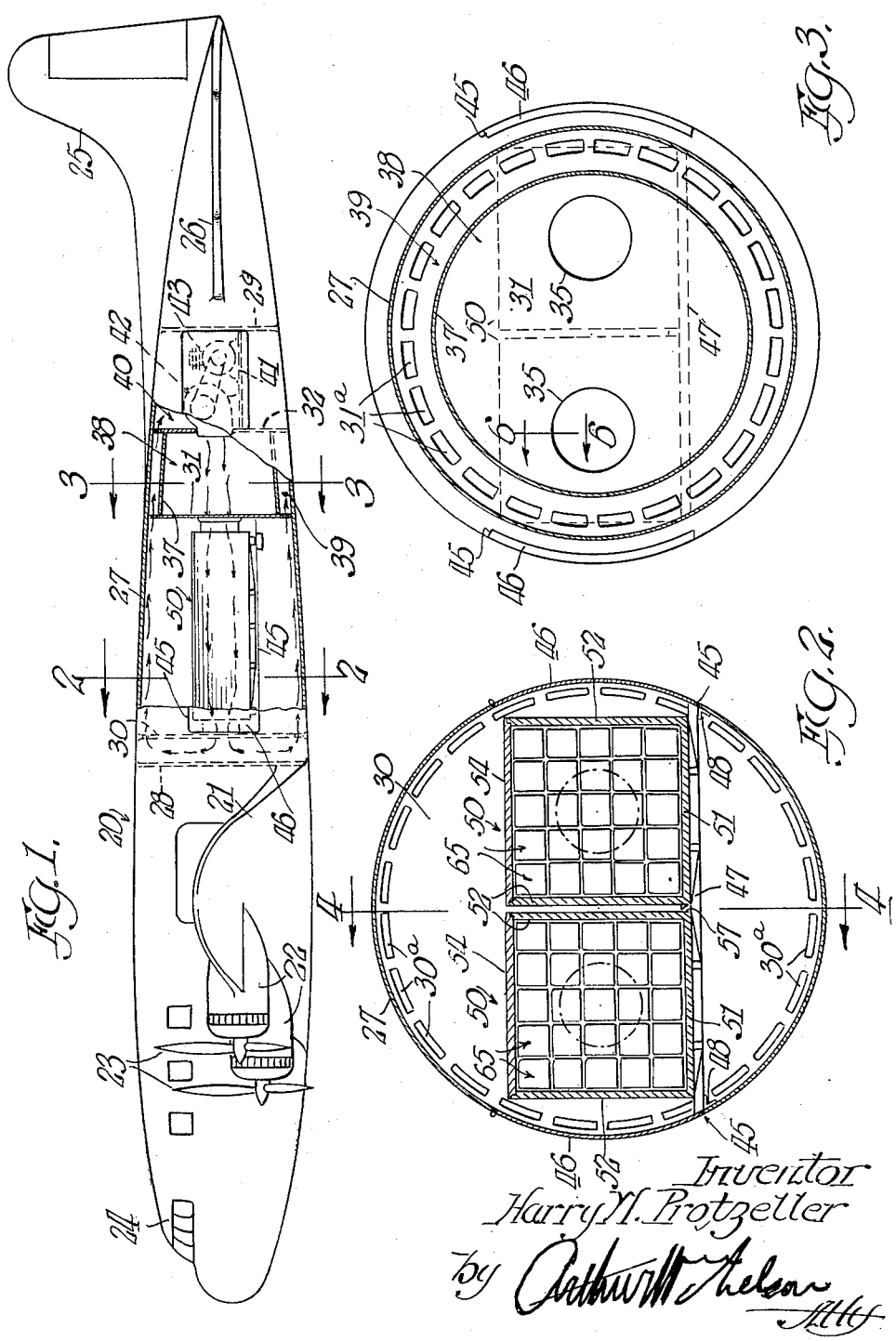

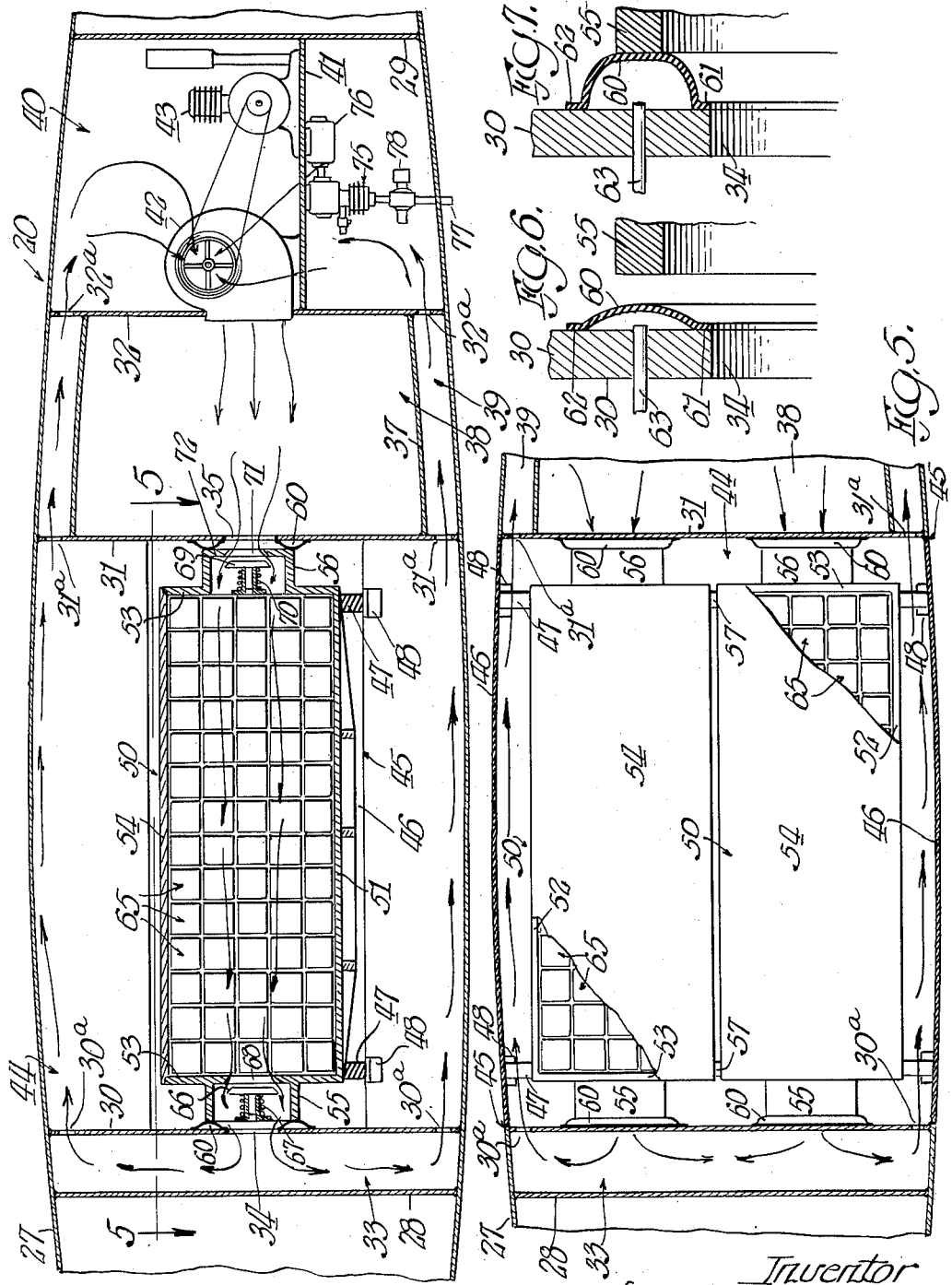

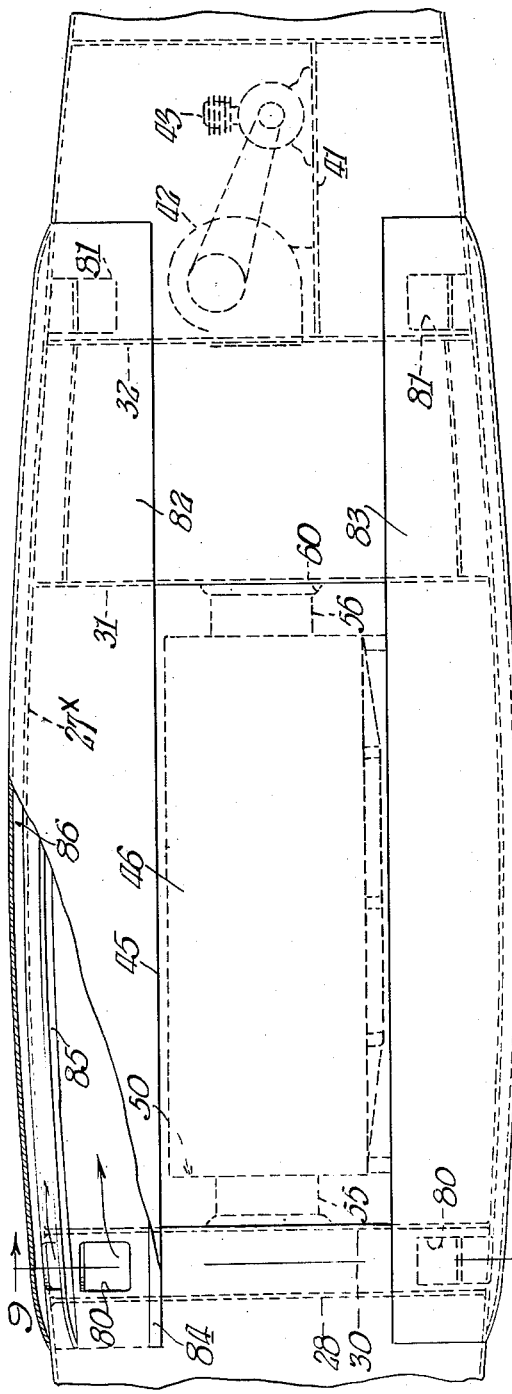
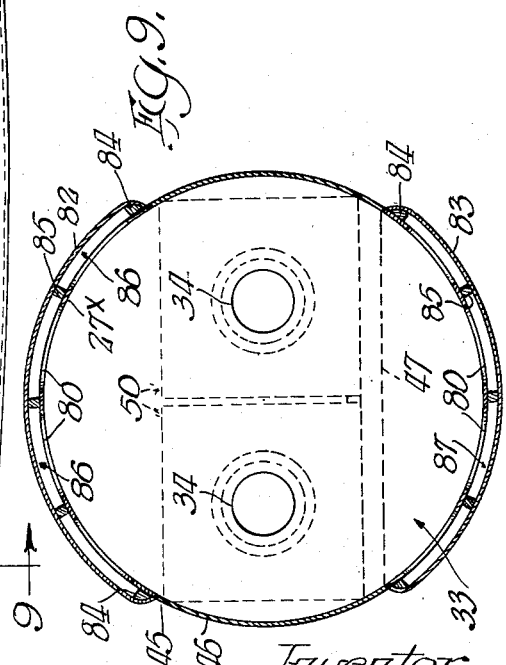

2,511,877

UNITED STATES PATENT OFFICE 2,511,877

METHOD OF AND APPARATUS FOR REFRIGERATING FOOD PRODUCTS

Harry W. Protzeller, Fairmont, Minn., assignor of one-half to Arthur Wm. Nelson, Park Ridge, Ill.

Application November 18, 1943, Serial No. 510,748

13 Claims. (Cl. 62—1)

This invention relates to improvements in methods and means for refrigerating food products and it consists of the matters hereinafter more particularly pointed out.

An object of the invention is to provide a method of refrigerating food products which may be practiced by means of aircraft and whereby improved results are obtained.

It is also an object of the invention to provide a method and means whereby food products may be refrigerated while in an aircraft using the aircraft skin or shell, at least in part, as the means of conducting the product heat to external atmosphere.

It is also an object of the invention to provide a method and means whereby food products may be frozen within the shell of an aircraft while operating at such an altitude as to provide a low pressure low temperature external atmosphere, including the modulation of the internal pressure as desired in accordance with the temperature of the product being frozen.

Again, it is an object to provide means whereby the foregoing refrigerating methods may be practiced by using existing types of aircraft with but little structural change.

The above mentioned objects of the invention, as well as others, together with the several advantages thereof, will more fully appear as the specification proceeds.

In the drawings:

Fig. 1 is a view in side elevation of an airplane, a part of the fuselage of which contains apparatus coacting therewith in forming one embodiment of the invention, parts of the fuselage being shown as broken away better to illustrate the invention.

Fig. 2 is a transverse vertical sectional view through part of the fuselage shown in Fig. 1, on a scale enlarged thereover, the plane of the section being indicated by the line 2—2 of Fig. 1.

Fig. 3 is another transverse vertical sectional view through a part of the fuselage of Fig. 1, as taken on the line 3—3 thereof and on substantially the scale of Fig. 2.

Fig. 4 is a longitudinal vertical sectional view through a part of the fuselage and contained parts as taken on the line 4—4 and on the scale of Fig. 2.

Fig. 5 is a longitudinal horizontal sectional view through said part of the fuselage and contained parts and as taken on the line 5—5 and on the scale of Fig. 4.

Fig. 6 is a fragmentary vertical detail sectional view on a further enlarged scale as taken on the line 6—6 of Fig. 3 and more particularly shows a hydraulic seal, which forms a part of the invention, in its contracted or collapsed condition.

Fig. 7 is a view similar to Fig. 6 showing the seal in its expanded condition.

Fig. 8 is a fragmentary view in side elevation, with parts shown as broken away, of a modified form of construction embodying the invention, which may be used in connection with an airplane.

Fig. 9 is a transverse vertical sectional view through the modified form of construction shown in Fig. 8 as taken on the line 9—9 thereof.

The present invention is more especially adapted for use in connection with airplanes capable of flight in high altitudes where low temperature air prevails. In an airplane having a fuselage with a thin sheet metal shell or skin of high heat conducting character, the parts employed are so correlated therewith that this character is used in obtaining the desired refrigerating effect upon the products in a container carried in the fuselage. When the shell or skin of the fuselage is made of material, such as plywood having a low heat conducting character, I provide openings in parts thereof and then enclose said parts in a blister of thin sheet metal of high heat conducting character so as to obtain the desired refrigerating effect. Therefore, the invention is applicable to airplanes having either kind of fuselage shells above mentioned.

In general I provide a plurality of chambers or compartments in the fuselage and one of which is capable of holding a plurality of product containers so made as to permit, under certain circumstances, a circulation of air in one direction therethrough. In another of said chambers is located an air moving means and driving motor, which in operation establishes a recirculation of air. The air passes through the product container so as to absorb heat units therefrom and then on into contact with the shell, which being relatively cold, takes up said heat units and by conduction dissipates them to the surrounding atmosphere.

Referring now in detail to that embodiment of the invention illustrated in the accompanying drawings and especially to Fig. 1 thereof, the airplane therein shown includes fuselage 20, and laterally extending wings 21, only one of which appears in said figure. The wing is formed with nacelles 22—22 each of which includes an engine or motor for driving an associated propeller 23. At the front end of the fuselage is the operating cabin 24 and at the rear end of the fuselage are vertical and horizontal controls 25 and 26 respectively.

The fuselage shown in Figs. 1 to 5 inclusive includes a thin sheet metal shell or "skin" 27 of high heat conducting characteristics. This shell or skin, in accordance with standard airplane practice, is fixed to the framing of the fuselage but not shown herein.

In part of the fuselage rearwardly of the wings 21, I provide a pair of front and rear imperforate bulkheads 28 and 29 in the form of circular plates. These bulkheads isolate that part of the fuselage between them from the front and rear end portions of the fuselage.

Between said bulkheads are intermediate bulkheads 30, 31 and 32, each provided near its peripheral margin with openings 30a, 31a and 32a respectively. The bulkhead 30, which is spaced relatively close to the bulkhead 28, and which co-acts therewith in forming a compartment 33, is provided at its mid portion with a pair of laterally spaced openings 34—34 as best indicated by dotted lines in Fig. 2. The bulkhead 31, is also provided with laterally spaced openings 35—35, only one of which appears in Fig. 4, and these align with the openings 34—34 in the bulkhead 30.

Extending between the bulkheads 31—32 and arranged radially inward from the openings 31a—32a therein is an annular wall 37 which co-acts with the bulkheads 31—32 in forming an inner expansion chamber 38 and an outer annular passage 39 which communicates at its ends with openings 31a and 32a in said bulkheads.

The bulkheads 29 and 32 provide a chamber 40 with which the annular chamber 39 communicates by means of the openings 32a in the bulkhead 32. In said chamber is a longitudinal support 41, of less width than the width of the chamber, for an air moving means 42 and its driving motor 43. The inlet side of this air moving means is in communication with the chamber 40 while its outlet side opens into the chamber 38.

The bulkheads 30—31 provide a relatively long chamber 44. On each side of the fuselage shell 27, there is a cargo opening 45 extending the full length of the chamber 44 and closable by means of a door 46. Extending transversely of the chamber 44, in substantially the plane of the bottom of the openings 45—45 are product container supports 47—47 which rest at their ends upon angle clips 48 secured to opposite sides of the shell of the fuselage at the bottom of the door openings 45 therein.

The compartment 44 is adapted to receive a plurality of product containers 50—50 arranged side by side therein. Each container is in the form of an open top elongated box-like body of square cross section and includes a bottom 51, side walls 52—52 and end walls 53—53 respectively, all preferably made of heat insulating material such as wood with suitable air spaces. A cover 54 is employed in connection with the open top of box-like body and the bottom of said body is braced on its underside by longitudinal and transverse stringer-like ribs.

The end walls 53 are provided with tubular extensions 55 and 56 respectively. The overall length of each product container 50 is somewhat less than the length of the door openings 45 and chamber 44 as defined by the bulkheads 30 and 31. Thus each container may be inserted into position through an associated door opening 45 to rest upon the transverse members 47 until the sides of said containers come up against a stop 57 on said bars (see Fig. 2). When said containers are so positioned, the tubular extensions 55 and 56 respectively, of each container, line up with associated openings 34 and 35 in the bulkheads 30—31.

As the overall length of the containers 50—50, as before mentioned, is less than the length of the door openings 45 and less than the distance between the bulkheads 30—31 to permit easy insertion and withdrawal of the containers, it is obvious that when said containers are disposed inside the fuselage a space is present between the ends of the associated extensions 55—56 and the bulkheads 30 and 31 respectively. To fill this space so as to there provide a seal between said extension and bulkhead, I apply to the inner opposed faces of each bulkhead 30—31 about the openings 34 and 35 therein, an inflatable and deflatable collar 60. This collar is in the form of a rubber-like ring having inner and outer flanges 61—62 (see Figs. 6 and 7) which are secured in a pressure-tight manner against the respective bulkheads 30—31. Passing through each bulkhead 30—31 from the outer surface thereof is one end of a tube 63 which extends into the annular chamber of each ring 60. The other end of each tube is connected by a three way valve to a hand operated hydraulic pump and reservoir (not shown) which is placed in a position in the fuselage for operation from the doorways 45.

Fig. 6 shows the ring 60 deflated so that a space is present between the outer face of the ring and the end face of the associated extension 55. From this figure it is obvious that the rings 60, when deflated, permit an easy insertion and withdrawal of the container relative to the fuselage. Fig. 7 shows the ring as inflated and at which time it forms not only a substantially pressure-tight seal between each extension 55 and 56 with its associated openings 34—35, but also provides cushions which prevent endwise shifting of the containers when in the fuselage.

Each container as here shown is adapted to hold a plurality of product packages 65—65 which form no particular part of the invention so that they are not illustrated or described in detail herein. However, it is mentioned that said packages are so made and correlated with respect to the inside of the container that when packed therein each one is spaced at its sides, top and bottom from its neighbor and is likewise spaced from the side, ends and bottom of the container. This permits free circulation of air about, between, over and under the respective packages in the container.

The tubular extension 56 of each container is provided with a valve 69 which is normally urged outwardly by a spring 70 to close against a valve seat 71 formed in an end wall 72 for the extension. When the pressure in the compartment 38 is such as to overcome the valve closing action of the spring 70, said pressure will function to move the valve inwardly and away from and to open the valve seat 71.

The tubular extension 55 of each container is provided with a valve 66 which is normally urged inwardly by a spring 67 to close against a valve seat 68 provided in the end wall 55 of the container. When the pressure in the container 50 is such as to overcome the valve closing action of the spring, said pressure will function to move the valve 66 outwardly and away from and to open said valve seat 68.

In the chamber 40 and supported from the member 41 is a vacuum pump 75 that is driven by an electric motor 76 as best appears in Fig. 4. The outlet side of said pump has a tube 77 connected thereto and which passes through the outer wall of the fuselage to atmosphere. In said tube is an electro magnetic valve 78 which may be controlled by the pilot in the cabin of the plane. Suitable gauges are provided in the cabin of the plane to show the pressure and temperature prevailing in that part of the fuselage in which the parts described are located.

At certain times it may be desired to equalize the pressure of that part of the fuselage between the bulkheads 28 and 29 with external atmosphere. This may be done by means of the valve 78 which will pass air from the fuselage space to atmosphere when the fuselage pressure is the higher and in the reverse direction when the external atmospheric pressure is the higher. For the freezing of certain products and under certain conditions, it may not be desirable to have the pressure within the fuselage the same as that of external atmosphere. When such is the case the vacuum pump may be operated to reduce the pressure to the extent desired.

*Operation of the construction described*

In the operation of the parts thus far described, assume that each container 50 has been packed with a plurality of packages 65 in the spaced apart manner before mentioned and that a cover 54 has been applied to each container. At this time pressure conditions inside and outside of each container are the same so that the valves 66 and 69 are held closed against their seats 68 and 71 by their respective springs 67 and 70. The filled containers are now brought into loading position with respect to an airplane having the construction before described.

The doors 46 are now manipulated to uncover the openings 45 in the opposite sides of the fuselage body and each container is inserted, sidewise, into the chamber 44 and onto the cross bars 47 until stopped by their engagement with the member 57 on said bars. This lines up the extensions 55 and 56 respectively of each container with the associated openings 34 and 35 and sealing rings 60, the latter of which at this time are deflated as in Fig. 6. Said rings are then inflated (by means of the pump before mentioned) so that said rings engage the associated ends of the respective tubular extensions 55 and 56. This provides an effective seal between said extensions and the associated openings 34—35 in the bulkheads 30—31. The doors 46 are then manipulated to close the respective openings 45 and the airplane is then ready to take flight.

When the plane has reached a certain altitude where low temperatures prevail, it is obvious that the shell or skin of the fuselage rapidly cools down to approximately the low temperature surrounding the fuselage. The motor 43 is then started to drive the air moving means 42. This air moving means will take in air from the chamber 40, move it into the chamber 38 and will there build up pressure sufficient to cause the valve 69 to open so that the air then enters the containers 50 through the extensions 56. Pressure in said container will soon build up to such an extent as to cause the valve 66 in the extension 55 to open against the action of the spring associated with that valve. Thus the air will pass through the container, through the bulkhead 30 and into the chamber 33.

In the passage of the moving column of air through the containers, heat units will be absorbed from the packages 65 therein and will be carried out of the containers as said air columns leave the same to enter the chamber 33. When the pressure builds up in this chamber, the moving column of air leaves the same through the openings 30a in the bulkhead 30 to enter that part of the chamber 44 in close proximity to the shell or skin metal 27 surrounding the same. In its passage through this chamber, the heat units absorbed by the moving column of air are conducted through the shell and passed off to atmosphere. The moving column of air then passes through the openings 31a in the bulkhead 31 and into the associated end of the annular channel 39 and out the other end thereof through the openings 32a in the bulkhead 32 back into the chamber 40 for reentry into the air moving means 42 for a recirculation in the path mentioned as indicated by the arrows in Fig. 4. Due to the fact that the airplane passes through the air at high speed, the refrigerating effect will be excellent even though the temperature differential between the inside and the outside of the fuselage be not great.

By means disposed in the cabin of the plane, the operator is kept advised of both pressure and temperature conditions in the circulatory system described. When these conditions indicate that the proper temperature in the container 50 has been arrived at to assure the desired refrigeration of the products in the packages 65, the motor 43 is stopped and the operation of the blower ceases. This results in a drop in pressure in the container 50 so that the valves 66 and 69 automatically close. The container as a whole is then tightly closed against the passage of air therethrough.

As before explained, for certain freezing operations it may be desired to mollify the pressure in the pressure-tight compartments between the bulkheads 28 and 29. When the plane leaves the ground the pressure therein would be that normal to the elevation of the airport. As the plane ascends, naturally the external atmosphere will become progressively lighter with a resultant lower pressure. Within certain limits the pressure within the freezing chamber of the fuselage may be lowered as the product freezes, by simply operating valve 78 to communicate the same with external atmosphere. Likewise, after the product has been frozen and the plane returns to lower altitudes (and higher pressures) the valves 78 may be operated as desired to increase the pressure within the fuselage chambers. Should it be desired to create in the freezing chamber a pressure condition lower than can be obtained by merely venting to atmosphere through the valve 78 at the particular altitude, then the vacuum pump 75 may be operated. In this way any desired temperature-pressure relationship within the freezing chamber may be obtained. Thus, by reducing the pressure as the product is frozen, it is possible to prevent such contraction of the product (reduction in volume) as will force product constituents through the external walls of the product. In this way loss of weight is prevented and what is more important, loss of vital constituents is prevented. The end result is a frozen food product which is far superior to those produced by those commercial systems wherein only the temperature is changed during the freezing operation.

When the plane lands at its destination, the doors 46, which form pressure-tight closures when closed, are first opened and the sealing rings 60—60 are then deflated and collapse far enough to clear the ends of the extensions 55—56. This deflation of the said rings is accomplished by the same pumps (before mentioned) which inflated them.

Each container 50 is now withdrawn laterally of the chamber 44 and out through the associated door opening for such handling as may then be necessary.

*Modified structure (Figs. 8 and 9)*

An airplane having a fuselage shell or skin 27x of poor heat conducting qualities (such for example as a plywood structure) may readily be converted for the practice of the invention. In carrying out the conversion, bulkheads 28—29—30 and 32 are installed as in the case of the structure shown in Figs. 1 to 5 inclusive, thereby providing the same arrangement of chambers or compartments, and also providing a door opening and door at each side of the fuselage. Additionally, openings 80 and 81 are cut through the top and bottom portions of the shell so as to communicate with the chambers 33 and 40 respectively.

I then apply to the parts of the shell 27x above and below the door openings 46 blister coverings 82 and 83 respectively, which are held in spaced relation with respect to the shell by means of side and intermediate spacing strips 84 and 85 respectively. The ends of said strips are beveled off as shown in Fig. 8 and terminate at points beyond the bulkheads 28 and 32. The end parts of blister or covering 82—83 each of which is made of thin sheet material of good heat conducting characteristics, are then caused to follow the taper of the ends of the spacing ribs 84—85 and are secured tightly to the shell or skin 27x of the fuselage.

With this construction, the space between the shell 27x and blisters or coverings 82 and 83 provide channels 86—87 which afford communication between the openings 80 and 81 in the shell 27x.

With the construction just above described, the circulatory system is such that the moving column of air will leave the chamber 33 by means of the openings 80 to enter one end of the channels and thus be confined in good close contacting engagement with the blisters or coverings 82 and 83 for a quick transfer of heat units therethrough. The moving column of air then leaves the channels by means of the openings 81 in the shell or skin and enters the chamber 40 for a recirculation by the air moving means.

Obviously, if desired, the same general arrangement may be used for an aircraft in which the shell or skin is of metal. This might be advantageous in adapting existing planes to the practice of this method without the necessity of greatly disturbing the structural parts of the plane.

While in the specific construction described the refrigerating chamber and associated parts are positioned within that part of the airplane shell termed the fuselage, the arrangement is such that other parts of the airplane may be such for example as the wing, in which event the shell or skin forming that part of the plane airfoil will serve as the member for conducting the heat of the product to surrounding atmosphere. Of course, in this case, as in the form more particularly described heretofore, means would be provided to permit the placement of the product in the refrigerating chamber and the removal thereof from the chamber after the product had been refrigerated.

*Conclusion*

The constructions described provide good refrigeration with low aerodynamic drag and low extra weight.

While, in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. The method of transport refrigeration of food products which comprises conveying the food products in a closed chamber formed at least in part by a shell which is a fixed structural part of an airplane, causing the airplane to ascend to an altitude having the desired low temperature, and there refrigerating the product by circulating air within the closed chamber and into heat transferring relation to the shell and product thereby removing heat from the product and passing it by conduction through the shell to external atmosphere.

2. The method of transport refrigeration of food products which comprises conveying the food products in a closed chamber formed at least in part by a shell which is a fixed structural part of an airplane, causing the airplane to ascend to an altitude having the desired low temperature and pressure, and there refrigerating the product by removing heat from the product and passing it by conduction through the shell to external atmosphere and in venting the chamber to atmosphere during the refrigerating stage to reduce the pressure in the chamber.

3. The method of transport refrigeration of food products which comprises conveying the food products in a closed chamber formed at least in part by a shell which is a structural part of an airplane, causing the airplane to ascend to an altitude having the desired low temperature and pressure, and there refrigerating the product by removing heat from the product and passing it by conduction through the shell to external atmosphere and in venting the refrigerating chamber to atmosphere during the refrigerating stage to reduce the pressure to one lower than that which obtained when the product was placed in the refrigerating chamber, and in subsequently opening the chamber to atmosphere during the return of the plane to lower altitude and lower pressure.

4. The method of transport refrigeration of food products which comprises conveying the food products in a closed chamber formed at least in part by a shell which is a structural part of an airplane, causing the airplane to ascend to an altitude having the desired low temperature, and there refrigerating the product by removing heat from the product and passing it by conduction through the shell to external atmosphere, and during the refrigeration stage controlling the pressure as desired within the refrigeration chamber.

5. In apparatus for the transport refrigeration of products, an aircraft having a skin portion forming an enclosure, bulkheads within the enclosure and forming a refrigerating chamber, sheet material secured to an external part of the skin and forming an air chamber, means for communicating the air chamber with the refrigerating chamber, and means for causing air circulation through said refrigerating chamber and said air chamber.

6. In apparatus for the transport refrigeration of products, an aircraft having a skin which is a fixed structural part of the aircraft and which forms an enclosure, bulkheads within the enclosure and with the skin forming a refrigerating chamber, and means for creating a partial vacuum in the refrigerating chamber.

7. The method of transport refrigeration of food products which comprises conveying the food products in a chamber formed at least in part by a shell which is a fixed structural part of an aircraft, traveling at high atmospheric altitudes from a starting point to a predetermined destination distant therefrom, circulating air within the chamber into contact with the food products interiorly of the aircraft shell and into contact with the shell of said aircraft during transit, thereby conducting the heat through said shell and dissipating it to the surrounding atmosphere and refrigerating the product during transit.

8. Apparatus for the transport refrigeration of products, comprising an airplane shell which is a fixed structural part thereof, wall means within the shell and spaced therefrom, said wall means being formed and positioned to provide a product holding compartment and at least one air conduit between the product holding chamber and the airplane shell, the airplane shell forming one wall of said air conduit, and means for circulating air in a path through the product chamber and said air conduit whereby heat may be removed from the product and passed by conduction through the airplane shell to surrounding atmosphere when the airplane is operated at high altitudes where low temperatures obtain.

9. Apparatus for the transport refrigeration of products, comprising an airplane shell which is a fixed structural part thereof, wall means within the shell and spaced therefrom, said wall means being formed and positioned to provide a product holding compartment and at least one air conduit between the product holding chamber and the airplane shell, the airplane shell forming one wall of said air conduit, means for circulating air in a path through the product chamber and said air conduit whereby the heat removed from the product passes by conduction through the airplane shell to surrounding atmosphere when the airplane is operated at high altitudes where low temperatures obtain, and means for reducing the pressure within the product holding compartment whereby the volume of the product may be controlled during refrigeration of the product.

10. Apparatus for the transport refrigeration of products, comprising an airplane shell which is a fixed structural part thereof, wall means within the shell and spaced therefrom, said wall means being formed and positioned to provide a product holding compartment and at least one air conduit between the product holding chamber and the airplane shell, the airplane shell forming one wall of said air conduit, means for circulating air in a path through the product chamber and said air conduit whereby the heat removed from the product passes by conduction through the airplane shell to surrounding atmosphere when the airplane is operated at high altitudes where low temperatures obtain, and a vacuum pump for reducing the pressure within the product holding compartment whereby the volume of the product may be controlled during refrigeration of the product.

11. Apparatus for the transport refrigeration of products, comprising an aircraft having a shell, providing a chamber therein, a product container of less length than said chamber and positioned therein, said container having an air opening in a wall thereof, operatively aligned with an air opening in a wall of said chamber, inflatable means interposed between said walls adjacent the openings therein, and completing communication therebetween, and means for circulating air through said product container and into heat transferring relationship to said shell.

12. Apparatus for the transport refrigeration of products, comprising an airplane fuselage, bulkheads in spaced relation therein forming a pressure-tight chamber, intermediate bulkheads spaced from said first mentioned bulkheads and forming a pressure-tight chamber therein, said intermediate bulkheads having openings therein, some of which are disposed adjacent the inner face of the fuselage wall and others inwardly thereof, means for circulating air longitudinally through said chambers and into close proximity to the inner face of the exterior wall of the fuselage.

13. In apparatus for the transport refrigeration of products, an aircraft having a skin, bulkheads within the enclosure and with the skin forming a closed chamber for the products to be refrigerated, a removable member associated with the refrigerating chamber and whereby access to the refrigerating chamber may be had to enable the placement of the products to be refrigerated therein and the removal thereof therefrom, and means for circulating air within the refrigerating chamber and into heat transferring relation to the inner face of the skin whereby said products may be refrigerated when the aircraft is operated through low temperature air.

HARRY W. PROTZELLER.

REFERENCES CITED

The following references are of record in the file of this patent:

UNITED STATES PATENTS

| Number | Name | Date |
|---|---|---|
| 1,702,194 | Bosch | Feb. 12, 1929 |
| 2,058,659 | Bellanca | Oct. 27, 1936 |
| 2,075,042 | Knerr | Mar. 30, 1937 |
| 2,184,954 | Conn | Dec. 26, 1939 |
| 2,285,945 | Rundell | June 9, 1942 |
| 2,345,204 | Lodwig | Mar. 28, 1944 |

FOREIGN PATENTS

| Number | Country | Date |
|---|---|---|
| 479,826 | Great Britain | Feb. 11, 1938 |
| 510,539 | France | Dec. 6, 1920 |
| 544,227 | Great Britain | Apr. 2, 1942 |